(12) United States Patent
Lahtinen

(10) Patent No.: US 10,399,196 B2
(45) Date of Patent: Sep. 3, 2019

(54) DEVICE FOR HYDRAULIC HAMMER

(75) Inventor: Kari Lahtinen, Kuopio (FI)

(73) Assignee: Finnsuoja Oy, Jyväskylä (FI)

( * ) Notice: Subject to any disclaimer, the term of this patent is extended or adjusted under 35 U.S.C. 154(b) by 802 days.

(21) Appl. No.: 13/640,753

(22) PCT Filed: Apr. 26, 2011

(86) PCT No.: PCT/FI2011/050373
§ 371 (c)(1),
(2), (4) Date: May 15, 2013

(87) PCT Pub. No.: WO2011/135178
PCT Pub. Date: Nov. 3, 2011

(65) Prior Publication Data
US 2013/0327553 A1 Dec. 12, 2013

(30) Foreign Application Priority Data
Apr. 26, 2010 (FI) ...................................... 20105455

(51) Int. Cl.
*E02F 1/00* (2006.01)
*B23Q 11/08* (2006.01)
*B25D 17/00* (2006.01)
*B25D 17/11* (2006.01)
*E02F 3/96* (2006.01)
*E02F 9/24* (2006.01)

(52) U.S. Cl.
CPC .......... *B23Q 11/0891* (2013.01); *B25D 17/00* (2013.01); *B25D 17/11* (2013.01); *E02F 3/966* (2013.01); *E02F 9/24* (2013.01)

(58) Field of Classification Search
CPC .......... E21B 41/0021; E21B 7/20; E21B 1/00; E21B 1/02; E21B 4/06; E21B 4/14; E21B 41/00; E21B 10/44; B25D 17/06
USPC .................. 173/90, 100, 112, 177, 197, 206
See application file for complete search history.

(56) References Cited

U.S. PATENT DOCUMENTS

| 2,136,315 A | 11/1938 | Walter | |
| 2,641,444 A * | 6/1953 | Moon ....................... | E21B 7/20 166/381 |
| 2,964,305 A * | 12/1960 | Samhammer ............. | C25C 3/14 173/152 |
| 3,078,933 A * | 2/1963 | Orner .................. | E21B 41/0021 175/219 |
| 3,280,925 A * | 10/1966 | Becker .................... | E21B 21/12 173/112 |

(Continued)

FOREIGN PATENT DOCUMENTS

| CN | 101035961 A | 9/2007 |
| EP | 0482327 | 4/1992 |

(Continued)

*Primary Examiner* — Andrew M Tecco
*Assistant Examiner* — Eyamindae C Jallow
(74) *Attorney, Agent, or Firm* — Seppo Laine Oy

(57) ABSTRACT

Device for a hydraulic hammer (1), in which there is a hydraulic impact system and a work point (2) for performing work, for preventing damage caused by ricocheting pieces. The device is formed of a shield (6) that can be lowered to the level of the work point particularly by hydraulic cylinders (7, 8). The shield (6) is formed of an essentially circular jacket, in which recycled materials, for example recycled vehicle tires, transport mats, or similar, are mostly used.

5 Claims, 2 Drawing Sheets

(56) References Cited

U.S. PATENT DOCUMENTS

| | | | | |
|---|---|---|---|---|
| 3,565,351 | A * | 2/1971 | Ross, Jr. | B02C 19/0081 |
| | | | | 100/240 |
| 3,674,100 | A * | 7/1972 | Becker | E21B 7/20 |
| | | | | 175/135 |
| 3,757,891 | A * | 9/1973 | Krieger | G10K 11/16 |
| | | | | 173/DIG. 2 |
| 3,833,072 | A * | 9/1974 | Back | B25D 17/06 |
| | | | | 173/105 |
| 4,228,862 | A * | 10/1980 | Causse | E21B 7/002 |
| | | | | 175/242 |
| 4,340,120 | A * | 7/1982 | Hauk | E21B 1/02 |
| | | | | 173/131 |
| 4,434,861 | A | 3/1984 | Howeth | |
| 4,449,592 | A * | 5/1984 | Mayer | E21B 19/20 |
| | | | | 173/164 |
| 4,534,419 | A * | 8/1985 | Vural | E02D 11/00 |
| | | | | 173/1 |
| 4,553,612 | A * | 11/1985 | Durham | E21B 19/086 |
| | | | | 173/152 |
| 4,938,296 | A * | 7/1990 | Brazell, II | E21B 7/022 |
| | | | | 173/164 |
| 4,993,501 | A * | 2/1991 | Zannini | B23Q 11/0883 |
| | | | | 173/197 |
| 5,067,570 | A * | 11/1991 | Gilcrease | E21B 7/006 |
| | | | | 175/121 |
| 5,082,068 | A * | 1/1992 | Cornell | E21B 7/02 |
| | | | | 173/189 |
| 5,082,069 | A * | 1/1992 | Seiler | E21B 7/12 |
| | | | | 175/171 |
| 5,137,096 | A * | 8/1992 | Druesdow | B25D 17/11 |
| | | | | 173/171 |
| 5,372,192 | A * | 12/1994 | Bitting | E21B 17/10 |
| | | | | 166/241.4 |
| 5,810,101 | A * | 9/1998 | Caraway, Jr. | E21B 7/005 |
| | | | | 173/185 |
| 6,164,393 | A * | 12/2000 | Bakke | E21B 31/113 |
| | | | | 173/177 |
| 6,199,656 | B1 * | 3/2001 | Vento | E21B 7/025 |
| | | | | 173/219 |
| 6,315,059 | B1 * | 11/2001 | Geldean | E21B 7/028 |
| | | | | 173/112 |
| 6,401,811 | B1 * | 6/2002 | Coone | E21B 19/06 |
| | | | | 166/75.14 |
| 6,439,317 | B1 * | 8/2002 | Minotti | E01C 23/124 |
| | | | | 173/11 |
| 8,327,950 | B2 * | 12/2012 | Pollock | E21B 7/028 |
| | | | | 173/185 |
| 8,631,898 | B2 * | 1/2014 | Luoma | E21B 7/025 |
| | | | | 175/162 |
| 2003/0094308 | A1 * | 5/2003 | Weixler | E02D 7/28 |
| | | | | 175/57 |
| 2003/0221870 | A1 * | 12/2003 | Johnson, Jr. | E21B 7/20 |
| | | | | 175/71 |
| 2004/0144551 | A1 * | 7/2004 | Koskimaki | B25D 9/18 |
| | | | | 173/1 |
| 2005/0150690 | A1 * | 7/2005 | Moriarty | E21B 7/00 |
| | | | | 175/57 |
| 2005/0189128 | A1 * | 9/2005 | Vought | E01C 23/124 |
| | | | | 173/89 |
| 2005/0236187 | A1 * | 10/2005 | Chen | E21B 7/067 |
| | | | | 175/61 |
| 2005/0247485 | A1 * | 11/2005 | Hay | E21B 43/103 |
| | | | | 175/57 |
| 2006/0048957 | A1 * | 3/2006 | Oksman | E21B 1/00 |
| | | | | 173/77 |
| 2006/0283633 | A1 * | 12/2006 | Benge | E21B 7/20 |
| | | | | 175/57 |
| 2007/0068677 | A1 * | 3/2007 | Angman | E21B 7/20 |
| | | | | 166/377 |
| 2008/0190633 | A1 * | 8/2008 | Johnston | E02F 3/966 |
| | | | | 173/184 |
| 2010/0116555 | A1 * | 5/2010 | Peltola | B25D 17/11 |
| | | | | 175/315 |
| 2010/0252251 | A1 * | 10/2010 | Harkins | E21B 33/02 |
| | | | | 166/85.1 |
| 2013/0256030 | A1 * | 10/2013 | Hammersmark | E21B 7/128 |
| | | | | 175/5 |
| 2013/0312991 | A1 * | 11/2013 | Hideta | B23Q 11/0046 |
| | | | | 173/197 |
| 2014/0231092 | A1 * | 8/2014 | Mock | E21B 41/0021 |
| | | | | 166/363 |
| 2015/0041168 | A1 * | 2/2015 | Dostinov | B25D 17/20 |
| | | | | 173/90 |

FOREIGN PATENT DOCUMENTS

| | | |
|---|---|---|
| GB | 1603874 | 12/1981 |
| JP | S0910127 B | 9/1977 |
| JP | 6-63873 | 3/1994 |
| JP | 2007275734 | 10/2007 |
| JP | 2009084812 A | 4/2009 |
| SU | 25511 A1 | 2/1932 |
| SU | 108213 A1 | 11/1956 |
| SU | 195622 | 5/1967 |
| SU | 1798165 | 2/1993 |
| WO | WO 2006038851 | 4/2006 |

\* cited by examiner

_US 10,399,196 B2_

DEVICE FOR HYDRAULIC HAMMER

CROSS REFERENCE TO RELATED APPLICATIONS, IF ANY

Not applicable.

STATEMENT REGARDING FEDERALLY SPONSORED RESEARCH OR DEVELOPMENT

Not applicable.

BACKGROUND OF THE INVENTION

Field of the Invention

The present invention relates to a device for a hydraulic hammer and particularly a device, with the aid of which it is possible to protect the surroundings from damage.

Background Information

A hydraulically-operated impact device, a hydraulic hammer, a hoe ram, a rock breaker, a hydraulic impact hammer, all of these are names for a tool that has been known for fifty years. Today, a numerous group of hammers are known and their use is quite widespread. A hydraulic hammer is usually attached to the end of the boom of an excavator and the excavator s hydraulic pressure is connected to it with the aid of suitable hoses.

A hydraulic hammer is used, for example, to break up frost-bound soil in excavation work. A chisel-like head is then often used, on which the impacts of the device are focused. A second usual application is demolition work, in which concrete structures often appear, the dismantling and breaking of which are work specially suited to a hydraulic hammer.

A third application is the breaking of stones or bedrock. It is obvious that a hydraulic hammer will not be used instead of blasting on large building sites, but quite often stone and rock outcrops appear, which it is not wished to blast, due to their size or location.

The high pressure used particularly in connection with concrete are stone causes the material to break in a way that throws the material into the surroundings. Objects are then in danger, but so even more so are people who are in the vicinity for one reason or another. The danger to people in particular can be serious.

According to the prior art, shields are known in which it is sought to suck and collect dust, in order to keep the work environment clean. In the same way, arrangements are also known, in which it is sought to attenuate the vibration caused by an impact hammer.

BRIEF SUMMARY OF THE INVENTION

The present invention is intended to create a solution to the problem of ricocheting chips and pieces. In particular, it is intended to create a strong structure, which will be able to effectively prevent ricocheting stone and other material from bouncing around to outside the work location and thus causing danger. An additional intention is to create a device, which is also environmentally friendly.

The aforementioned and other advantages and benefits of the present invention are achieved in the manner described as characteristic in the accompanying Claims.

BRIEF DESCRIPTION OF THE SEVERAL VIEWS OF THE DRAWING

In the following, the invention is described in greater detail with reference to the accompanying schematic drawings, which show a simplified image of one well-regarded embodiment of the invention.

DETAILED DESCRIPTION

Figure 1:
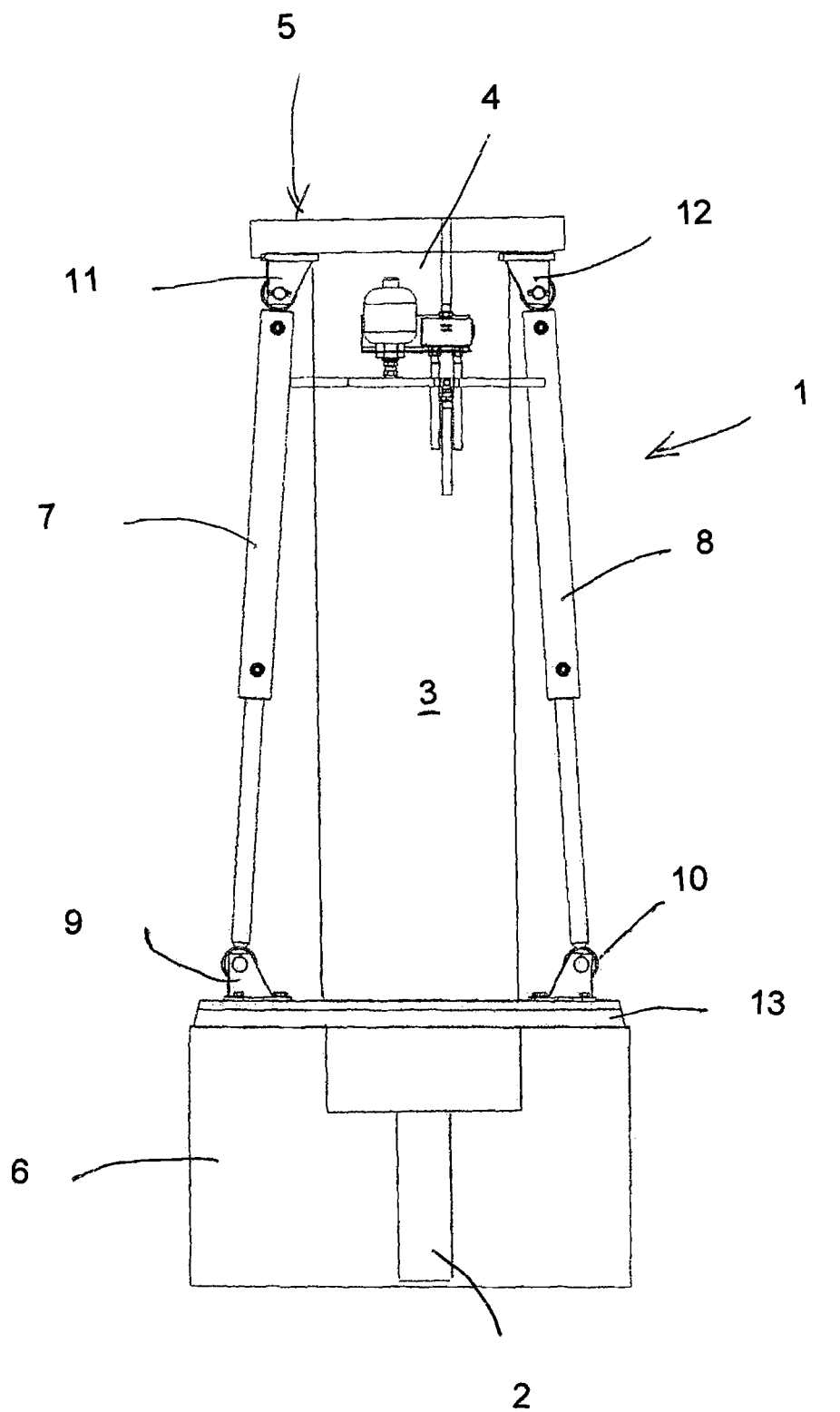
FIG. 1 shows an assembly, which is equipped with the device according to the invention, seen in a partially transparent cross-sectional side view.

Thus, the figure shows a hydraulic hammer, which is equipped with the device according to the invention. The figure is drawn to be transparent. A hydraulic hammer 1 is often some kind of package, into which hydraulic hoses lead, which are not shown in the figure, and inside which package are all the elements, with the aid of which an impact effect is achieved in the work point 2. In the figure, the body of the hammer is marked with the reference number 3 and some of the elements required to create an impact with the reference number 4. Such a package is attached with the aid of suitable means to the boom of an excavator. The attachment means are also not shown, due to their conventional nature, but the reference number 5 is used to depict the attachment plane, to which suitable, especially quick-release locking attachment means are connected.

When such a hydraulic hammer is used to break hard materials, such as rock, it is obvious that, due to the very great forces, pieces and chips of different sizes ricochet from the work point into the surroundings. As stated, these ricocheting parts can have an effect causing both material damage and especially physical injuries to persons in the vicinity.

According to the invention, this is avoided by adding to the hydraulic hammer the shield 6 shown in the figure, which can be raised to the upper position, in which the operator will see the position of the work point, and lowered to the lower position shown in the figure, in which it protects the surroundings. To raise and lower the shield, hydraulic cylinders 7, 8 are used, which are attached at their lower ends to the shield 6 by means of lugs 9, 10 and at their upper ends to the body structures of the hammer with the aid of lugs 11, 12. In the known manner, the hydraulics for operating the hydraulic cylinders already exist in the device shown. The hydraulic cylinders 7, 8 are mainly dual-operating cylinders.

If necessary, suitable guides, which ensure that the shields move as desired, can be attached to the body 3 of the hammer 1. Such guides can operate on the slider-rail principles, but perhaps a more operationally reliable alternative is to use a short arm, which is attached to the body of the hammer and at the other end to the shield, and which guides the shield to the lower position when moving close to the body of the hammer and then, when raising the shield, the shield, having made a curve according to the length of the arm, also moves to the upper position close to the body.

According to a very highly regarded embodiment, the shield 6 is manufactured, at least to principally, from recycled materials. Thus, the material of the essentially cylindrical skirt part can be from a conveyor belt that had been taken out of use, such as are changed and replaced from time to time in many sectors of industry. The material must be sufficient sturdy to catch the ricocheting stones and prevent them from going into the surroundings.

Another recycled material, which can be advantageously used for constructing the invention, is a tire that has been taken out of use, preferably a truck tire. One side is removed from such tires. This is shown with the reference number 13. The jacket 6 is attached to the tread of the tire 13 in a suitable manner, for example using a screw attachment.

Figure 2:
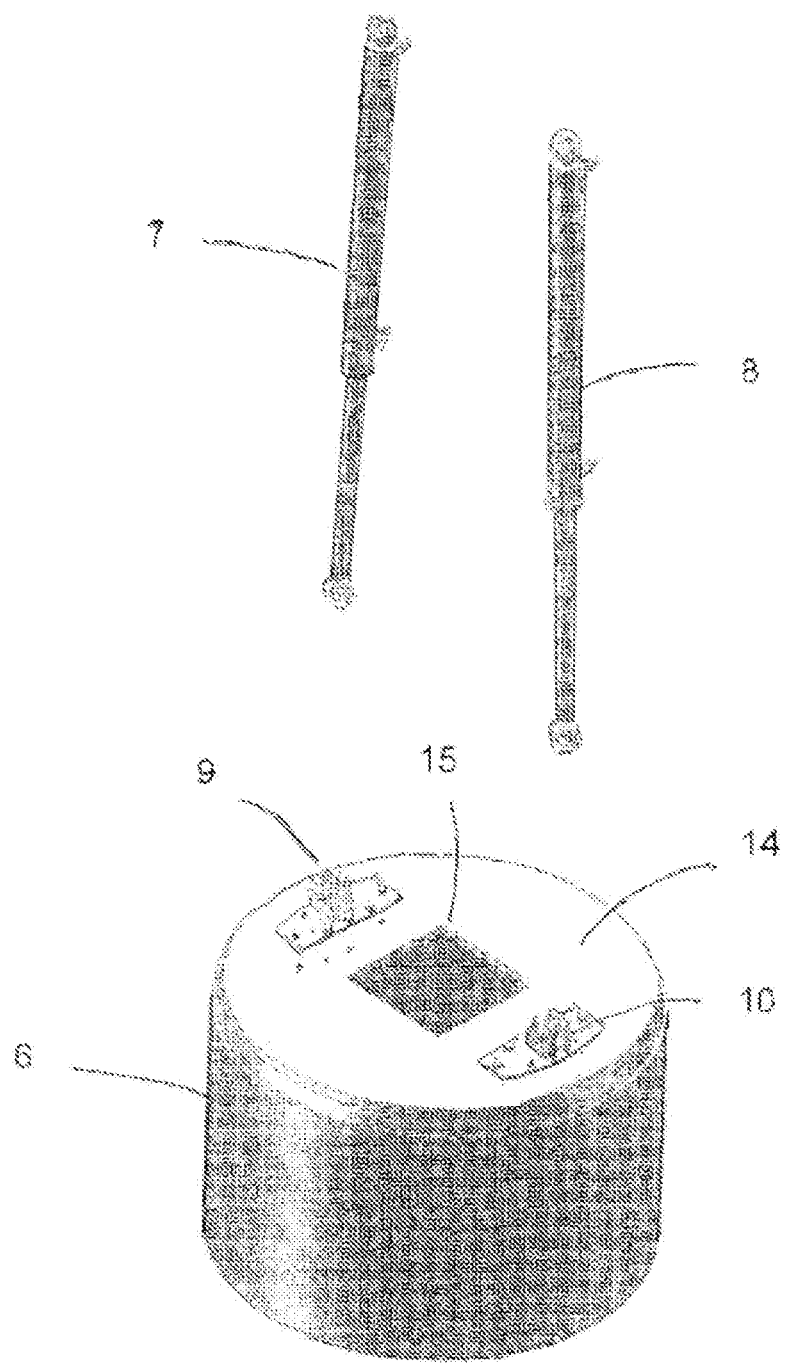
FIG. 2 shows the same construction, but now, however, partly stripped down and seen at an angle.

It can be seen clearly from FIG. 2, that the shield according to the invention forms an essentially closed cup-like structure, in which there is a cover 14. The cover 14 is principally laminated to the rest of the structure and is equipped with an opening 15 shaped like the body of the hydraulic hammer. In the best case, the cover 14 is an essentially tightly closed arrangement around the body 3 of the hydraulic hammer. Because in most cases the body is essentially square, and also if there is a hole in the cover 14 for the said body 3, which is relatively tightly around the body, a guide will be formed naturally and by using hydraulic cylinders the shield will rise and fall, while remaining firmly in place in all positions, thanks to the said hole. Another aspect is that, because the shield forms a closed space on the one hand against the base and on the other thanks to the cover 14 fitting tightly around the body, the dust and especially noise detriments are reduced.

A hydraulic hammer is used quite often in such a way that the work point presses lower than the area surrounding it, which can lead to a situation, in which the shield remains carrying the work point of the hydraulic hammer away from the surrounding area. In order to avoid this, the hydraulic cylinders 7, 8 are used to lift the shield 6 according to how the point 2 presses down at the work location. If necessary, this functionality can be automated.

According to a second embodiment of the invention, hydraulic cylinders are not used, instead the shield 6, which then has particularly an annular shape, is suspended on chains attached the upper areas of the body 3 of the hydraulic hammer, in a freely-hanging manner. The >carrying=referred to above should not then occur. Instead of chains, the shield can be attached to the body 3 with the aid of slider rails or similar, which permit the shield to move vertically. The shield will then rise automatically along the slider rails if, in the work situation, the hydraulic hammer presses down relative to the ground or other surface being worked on.

It is obvious that a shield 6 like that shown is an effective protection for preventing damage that may happen in all directions. If desired, the shield can also be manufactured in two or more parts. In terms of structure and manufacture, a structure forming a unified ring is the best alternative.

As stated, a vehicle tire can be used as part of the structure. But the jacket part 6 too can, if wished, be manufactured especially from a large-size tire taken out of vehicle use, or from two tire parts set on top of each other. The tread of a vehicle tire is extremely durable in terms of impact resistance. Such a solution is cheap and fully practicable, and for its part also solves problems relating to the recycling of tires. Wear in the tread in no way detracts from the operation or reliability of the shield.

However, it is obvious that any material and shaping whatever can be used in order to construct the shield, because a circular shape is in no way essential according to the basic idea of the invention.

The device according to the invention can also be relatively easily retrofitted to existing rock breaker structures, so that a very large proportion of existing structures can be brought into the sphere of safe working.

In addition to the fact that the invention makes it possible to prevent stones or similar from ricocheting, it is also of benefit in reducing the dust created when working and particularly the strong materials used according to the invention also powerfully reduce detrimental noise, which always arises in work of this type.

Some practical alternatives of the invention are presented above. Many variations are possible while remaining within the basic idea of the invention and the scope of protection of the accompanying Claims.

The invention claimed is:

1. A hydraulically operated hammer comprising:
a body,
a hydraulic impact system,
a work point attached to the body for performing work, and
an independently actuated shield arranged around the body for preventing damage caused by ricocheting pieces, said shield comprising a closed jacket and a cover, in which cover there is an opening for the body, such that the shield and body combine to form a closed space,
wherein:
the hydraulic impact system is arranged for producing an impact effect on the work point,
the shield is adapted to be lowered and raised using a hydraulic cylinder or cylinders, the hydraulic cylinders being attached at their upper ends to the body and at their lower ends to the shield, and
when the shield has been raised to an upper position, the work point is visible, and when the shield has been lowered to a lower position, the shield encloses the work point and forms a closed space
wherein the shield further comprises a guide to guide upward/downward movement of the shield on a desired path, the guide being formed of an opening in the cover of the shield.

2. The hydraulically operated hammer of claim 1, wherein the shield is formed of a ring that is circular, unified, or divided into several parts.

3. The hydraulically operated hammer of claim 1, wherein the shield comprises parts of a vehicle tire/tires, or conveyor belts destined for recycling.

4. The hydraulically operated hammer of claim 1, wherein the work point is a chisel head.

5. The hydraulically operated hammer of claim 1, wherein a material of the shield has at least an impact resistance of a vehicle tire.

* * * * *